(12) United States Patent
Davis

(10) Patent No.: US 7,457,502 B2
(45) Date of Patent: Nov. 25, 2008

(54) SYSTEMS AND METHODS OF COOLING A FIBER AMPLIFIER WITH AN EMULSION OF PHASE CHANGE MATERIAL

(75) Inventor: James Albert Davis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 10/815,920

(22) Filed: Apr. 1, 2004

(65) Prior Publication Data

US 2005/0220429 A1 Oct. 6, 2005

(51) Int. Cl.
*G02B 6/00* (2006.01)
(52) U.S. Cl. ...................................... 385/134
(58) Field of Classification Search .................. None
See application file for complete search history.

(56) References Cited

U.S. PATENT DOCUMENTS

| | | | |
|---|---|---|---|
| 3,646,472 A | 2/1972 | Cooper et al. |
| 4,325,006 A | 4/1982 | Morton |
| 4,572,609 A | 2/1986 | Sukuragi et al. |
| 4,707,073 A | 11/1987 | Kocher |
| 4,806,289 A | 2/1989 | Laursen et al. |
| 4,915,474 A | 4/1990 | Klein et al. |
| 4,945,457 A | 7/1990 | Yazdani et al. |
| 5,373,576 A | 12/1994 | Minns et al. |
| 5,737,473 A | 4/1998 | Nath |
| 5,762,493 A * | 6/1998 | Rechmann | 433/29 |
| 5,857,052 A | 1/1999 | Nath |
| 6,167,177 A | 12/2000 | Sandström et al. |
| 6,343,174 B1 | 1/2002 | Neuberger |
| 6,377,591 B1 * | 4/2002 | Hollister et al. | 372/6 |
| 2003/0198264 A1 | 10/2003 | Vetrovec et al. |
| 2004/0081420 A1 * | 4/2004 | Nasiri et al. | 385/137 |
| 2005/0111804 A1 * | 5/2005 | Bjarklev et al. | 385/125 |

FOREIGN PATENT DOCUMENTS

| | | |
|---|---|---|
| JP | 58009102 A | 1/1983 |
| JP | 63127215 A | 5/1988 |
| JP | 63234207 A | 9/1988 |
| JP | 03236001 A | 10/1991 |

* cited by examiner

*Primary Examiner*—Timothy Rude
(74) *Attorney, Agent, or Firm*—Alston & Bird LLP

(57) ABSTRACT

A system for cooling a fiber amplifier includes a fiber amplifier assembly, which, in turn, includes a longitudinally-extending fiber amplifier, a jacket and a retaining structure. The jacket surrounds the fiber amplifier and extends at least partially longitudinally therealong. In this regard, the jacket surrounds the fiber amplifier such that the fiber amplifier assembly defines a passage between the jacket and the fiber amplifier for the circulation of coolant therethrough. To facilitate the circulation of coolant, the retaining structure is disposed within the passage defined by the fiber amplifier assembly for at least partially maintaining a spacing between the fiber amplifier and jacket. The retaining structure and coolant can both comprise an emulsion of phase change material.

12 Claims, 8 Drawing Sheets

SYSTEMS AND METHODS OF COOLING A FIBER AMPLIFIER WITH AN EMULSION OF PHASE CHANGE MATERIAL

FIELD OF THE INVENTION

The present invention relates generally to optical fiber amplifiers and, more particularly, to techniques for cooling an optical fiber amplifier.

BACKGROUND OF THE INVENTION

Laser systems including fiber amplifiers are commonly used in many applications, including telecommunications applications and high power military and industrial fiber optic applications. For example, both U.S. Pat. No. 5,946,130, issued Aug. 31, 1999 to Rice and U.S. Pat. No. 5,694,408 issued Dec. 2, 1997 to Bott et al. describe many such applications in which laser systems including fiber amplifiers are employed including the processing of materials, laser weapon and laser ranging systems, and a variety of medical and other applications. In this regard, such fiber amplifiers generally include optical fibers that passively transmit optical power, fibers that experience or are designed to enhance performance of a laser through nonlinear optical processes such as Raman-shifting and Brillouin scattering, as well as optical fibers that are doped with a lasing ion embedded in the fiber material. For more details of such applications, see U.S. Pat. No. 5,832,006 issued Nov. 3, 1998 to Rice et al., the contents of which are hereby incorporated by reference in its entirety, which describes coherently phasing Raman fibers in a high brightness array. In addition, see U.S. Pat. No. 6,363,087 issued Mar. 26, 2002 to Rice, the contents of which are also incorporated by reference, which describes a multimode Raman fiber amplifier.

Optical fiber amplifiers are designed to increase the power output levels of the signals propagating therealong. One conventional optical fiber amplifier design is an end-pumped dual-clad fiber, such as that described in U.S. Pat. No. 4,815,079 issued Mar. 21, 1989 to Snitzer et al. Referring to FIGS. 1A and 1B, the dual-clad fiber 1 has a single mode signal core 2, a multi-mode pump core 3 surrounding the signal core, and an outer cladding layer 4 surrounding the pump core for confining pump energy within the pump core such that signals propagating through the signal core are amplified. The signal core will typically be doped with one or more rare earth elements such as, for example, ytterbium, neodymium, praseodymium, erbium, holmium or thulium.

In operation, pump energy is coupled into the pump core 3 at the input end 5 of the fiber. The pump energy then propagates through the pump core until it is absorbed by the dopant in the signal core 2, thus amplifying signals propagating through the signal core. Although dual-clad fibers 1 can have different sizes, one typical dual-clad fiber includes a signal core that has a diameter of 8-10 μm and a pump core that has cross-sectional dimensions of 100-300 μm. End-pumped dual-clad fiber amplifiers of this size can typically reach fiber energy power levels of 100 W. Recent demonstrations of fiber lasers operating with output powers in excess of one kilowatt have been performed. The use of large core multimode fiber designs have increased the power output beyond those limits encountered in single-mode fiber lasers. The large core multimode fibers can have a doped core with cross-sectional dimensions on the order of 30 to 50-microns in diameter or larger. The pump cladding sizes have increased to about 350 microns in diameter with an outer cladding to over 500 microns in diameter. Additionally, progress has been made on construction of photonic, bandgap or "holey" fibers that have voids within the fiber to improve the wave-guiding properties of the fiber construction. All of these designs have a need to remove excess heat from the doped core of the fiber laser oscillator or amplifier.

In general, laser systems can scale arrays of fiber amplifiers to produce higher power by coupling the output energy from a bundle of relatively low-power, fiber amplifiers. It will be appreciated, then, that scaling fiber amplifiers is generally driven by the ability to coherently combine the output of multiple fiber amplifiers. In this regard, to combine the outputs, the individual fiber amplifiers must typically comprise low-noise, single-mode amplifiers that polarize the output energy such that the energy from the individual amplifiers can be efficiently combined into an integrated array. Stable control of the thermal environment of the fiber amplifier is required to maintain the low-noise operation for phasing of fiber arrays. Uncontrolled heating of a fiber creates significant changes in the optical length and hence the optical phase of the signal at the output ends. Rapid heating would cause significant tracking issues for phase modulation and control techniques needed to coherently phase the outputs of two or more fibers.

Although laser systems generate coherent output power in a manner that is intrinsically efficient, a physical limit referred to as the quantum defect limit typically limits the energy conversion process of such systems. As is known, quantum defect is the difference in the photon energy at which the process is pumped versus the energy of the radiated "lasing" photons. For the most efficient systems, 70% to 90% of the pump energy from laser diode pump photons is converted to output energy. For less efficient arrangements, however, the efficiencies can lie in the range of 40% to 50% or lower. Generally, the quantum defect limit, as well as spontaneous radiation losses, miscellaneous optical absorption losses and other non-productive processes, lead to thermal energy release that heats the fiber amplifier.

In continuous or quasi-steady operational modes, the temperature of the fiber amplifier will rise until an equilibrium heat transfer condition is established. For high power laser systems, such a rise in temperature can result in elevated temperatures in the core of the fiber amplifier (typically where doped lasing media is located in fiber amplifiers having a doped core). In turn, the elevated core temperature can degrade the efficiency of the laser system, lead to unacceptable optical distortions or, in the extreme, to failure of the fiber amplifiers or surrounding system materials and components. Thus, it would be desirable to design a fiber amplifier and optical fiber laser system that conduct heat away from the core of the fiber amplifier or otherwise decrease the amount of heat generated in the fiber core.

SUMMARY OF THE INVENTION

In light of the foregoing background, the present invention provides systems and methods of cooling a fiber amplifier, such as a dual-clad fiber amplifier. Advantageously, embodiments of the present invention are capable of cooling a fiber amplifier in a uniform manner. And by cooling the fiber amplifier in a uniform manner, embodiments of the present invention permit the fiber amplifier to experience a uniform thermal gradient across the fiber at acceptable temperatures, to thereby provide efficient operation of the fiber amplifier. In this regard, embodiments of the present invention are capable of cooling a fiber amplifier in a manner that reduces deleterious thermal stresses and optical degradations.

According to one aspect of the present invention, a system is provided for cooling a fiber amplifier. The system includes a fiber amplifier assembly, which, in turn, includes a longitudinally-extending fiber amplifier, a jacket and a retaining structure. The jacket surrounds the fiber amplifier and extends at least partially longitudinally therealong. The jacket surrounds the fiber amplifier such that the fiber amplifier assembly defines a passage between the jacket and the fiber amplifier for the circulation of coolant therethrough, such as to place the coolant in direct thermal communication with the fiber amplifier. To facilitate the circulation of coolant, the retaining structure is disposed within the passage defined by the fiber amplifier assembly for at least partially maintaining a spacing between the fiber amplifier and jacket.

Advantageously, the retaining structure and coolant can both comprise an emulsion of phase change material. Generally, the coolant can be selected to have a refractive index smaller than a refractive index of the fiber amplifier. More particularly, the emulsion of phase change material can comprise, for example, a plurality of phase change materials suspended in a carrier fluid, where each phase change material comprises an encapsulated composition. In this regard, the phase change materials can be positioned within the passage such that the phase change materials remain at least partially stationary. In such instances, the fiber amplifier assembly can define a passage between the jacket and the fiber amplifier such that the phase change materials remain at least partially stationary and the carrier fluid circulates through the passage.

According to another embodiment of the present invention, the fiber amplifier assembly comprises at least one sheet spacer and the fiber amplifier. In this embodiment, the fiber amplifier is capable of being mounted in a serpentine manner through the sheet spacer to thereby maintain separation between portions of the fiber amplifier. Additionally, by mounting the fiber amplifier in a serpentine manner through the sheet spacer, the fiber amplifier assembly can define a passage between the portions of the fiber amplifier for the circulation of coolant therethrough.

In addition to the fiber amplifier assembly, the system can include a thermal management system capable of circulating coolant through the passage defined between the jacket and fiber amplifier of the fiber amplifier assembly. More particularly, the thermal management system can be capable of placing coolant in thermal communication with the fiber amplifier such that the coolant can carry heat away from the fiber amplifier. Then, the thermal management system can be capable of rejecting the heat carried away by the coolant. For example, the thermal management system can be capable of placing coolant in thermal communication with the fiber amplifier such that the coolant can at least partially melt to thereby carry heat away from the fiber amplifier. In turn, the thermal management system can be capable of condensing at least a portion of the partially melted coolant to thereby reject the heat carried away by the coolant.

According to other aspects of the present invention, methods are provided for cooling a fiber amplifier.

BRIEF DESCRIPTION OF THE DRAWINGS

Figure 1A:
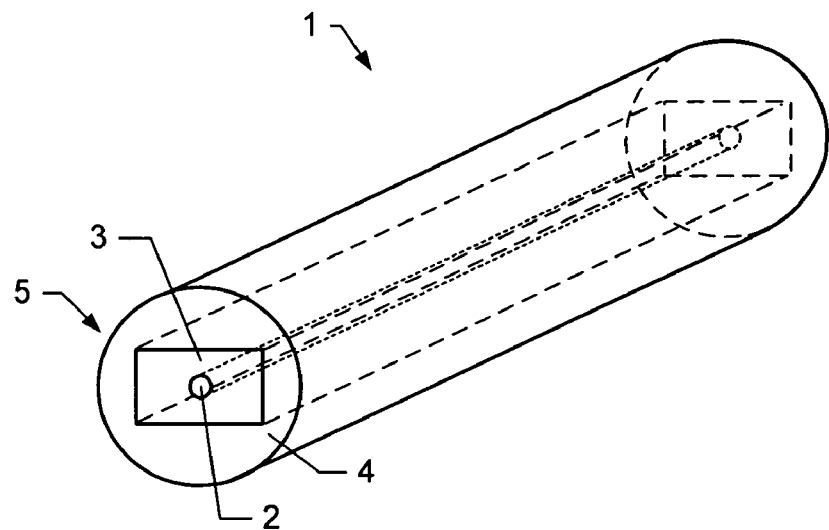
Figure 1B:
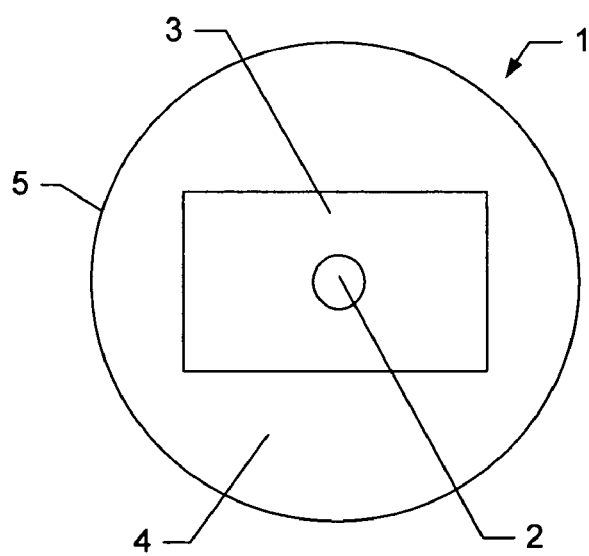
Figure 2:
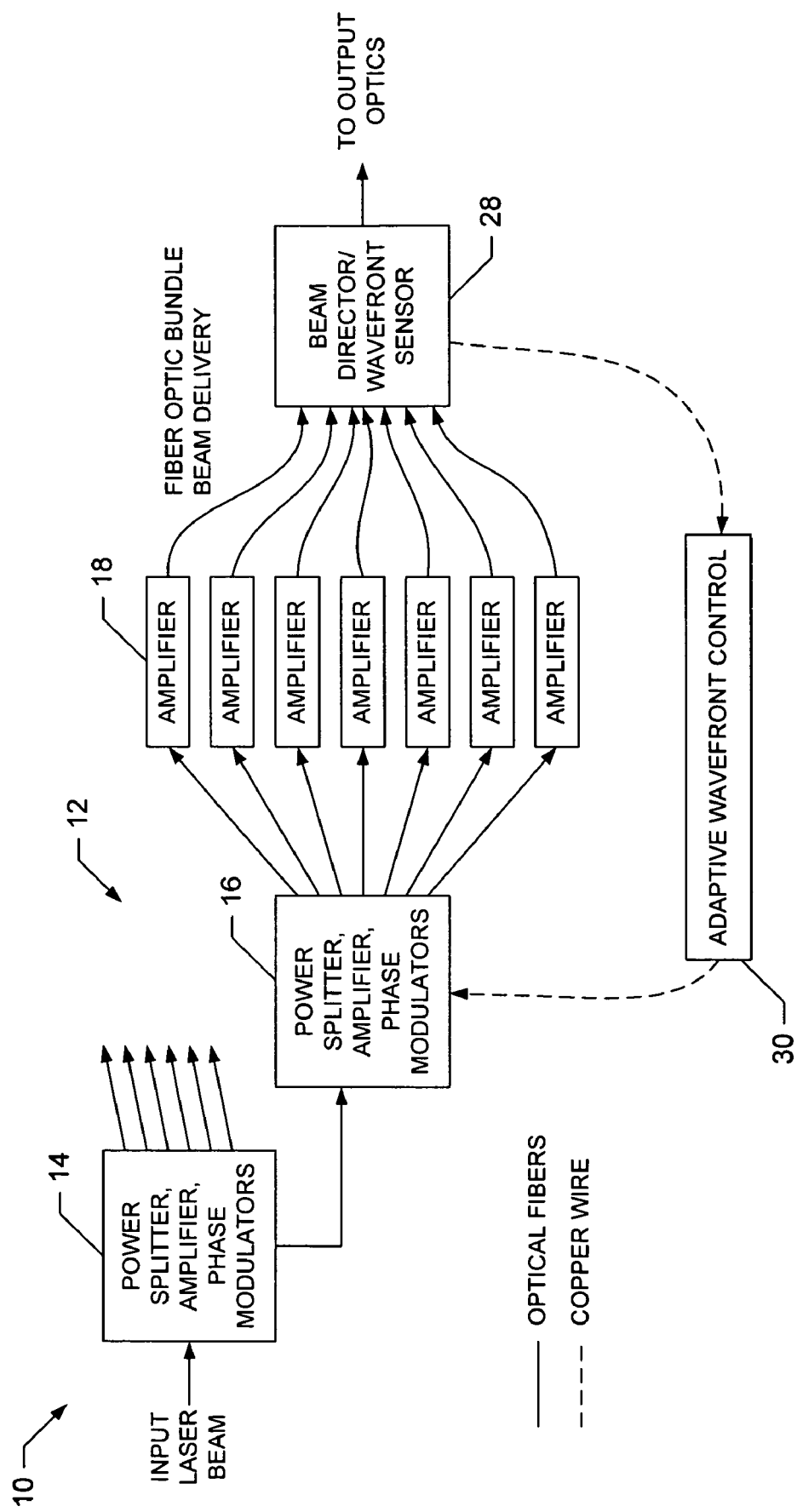
Figure 4:
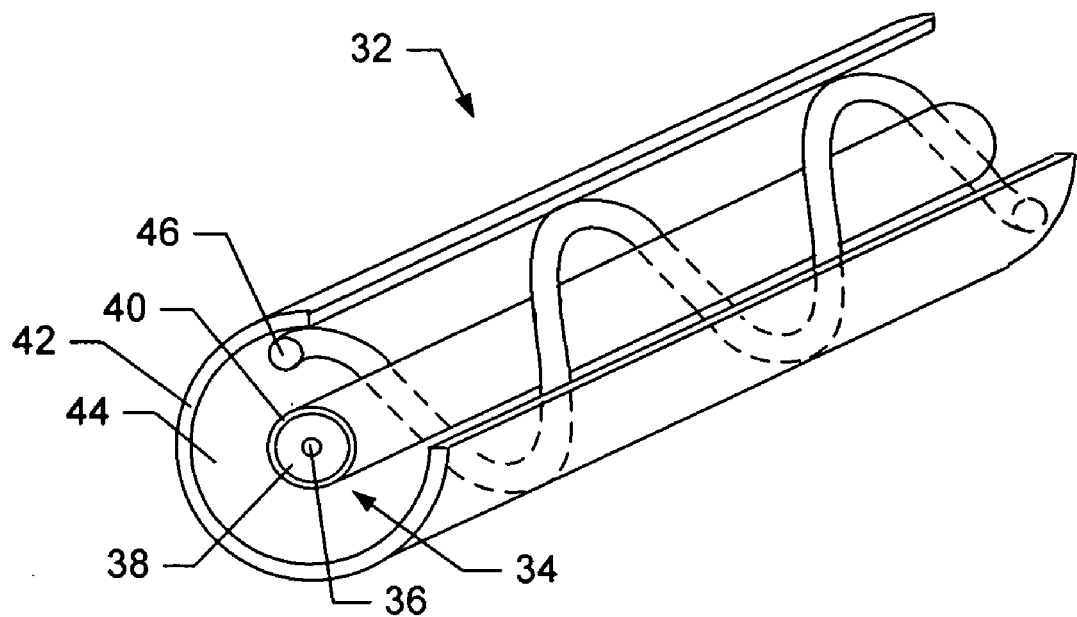
Figure 5:
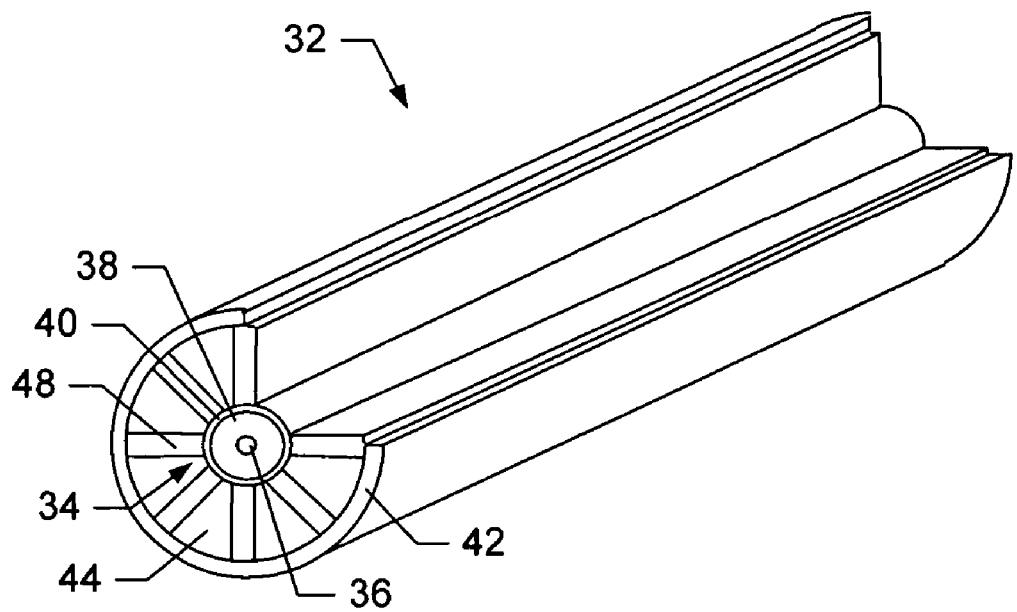
Figure 6:
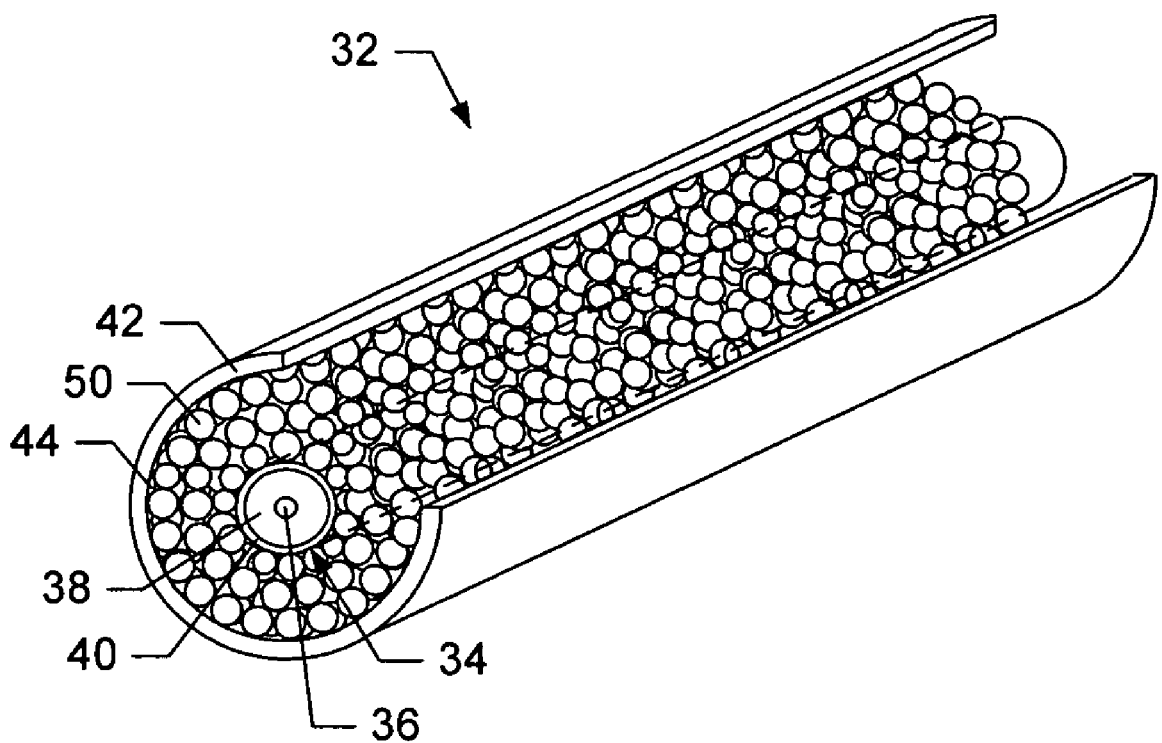
Figure 7:
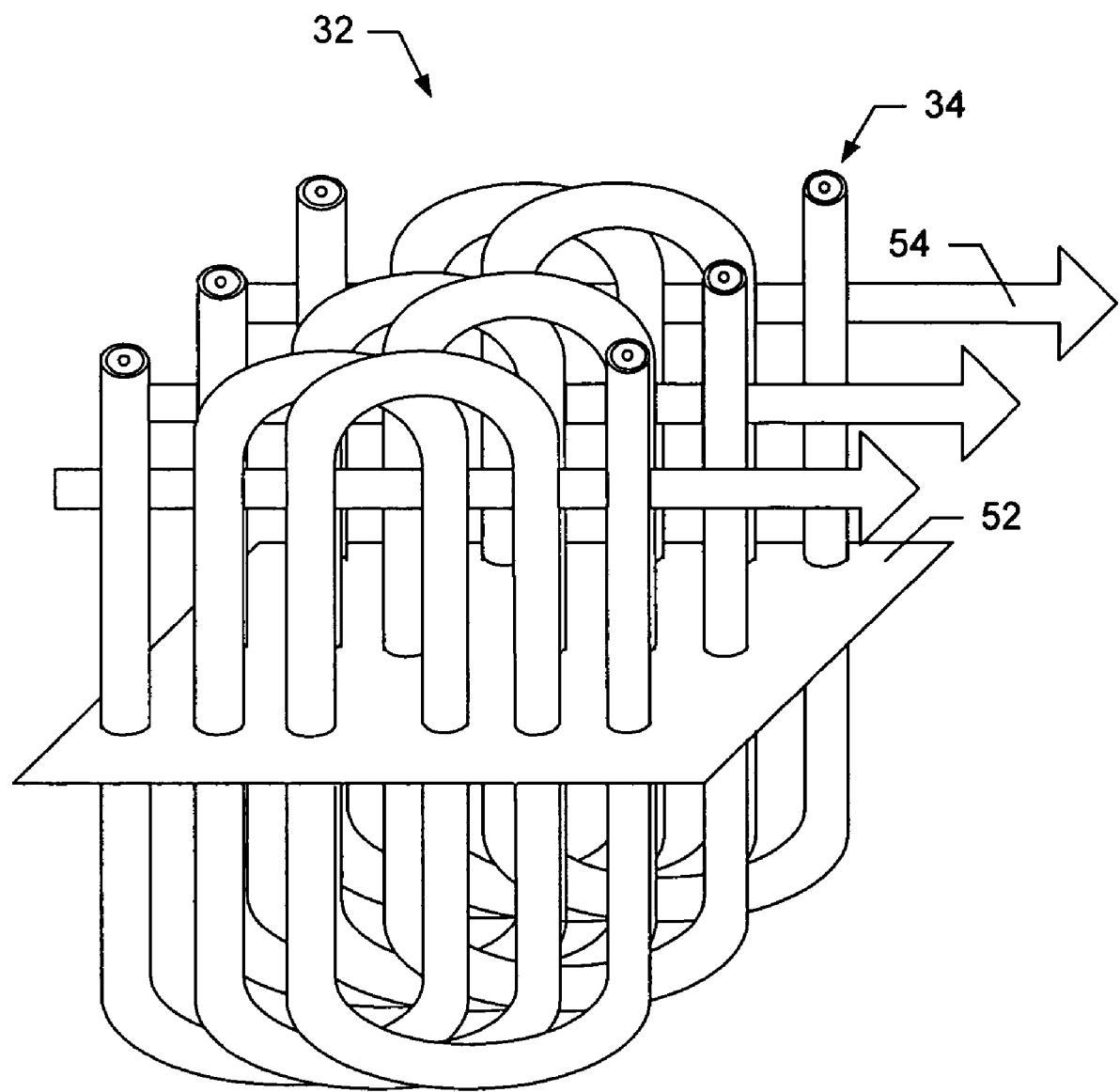
Figure 8:
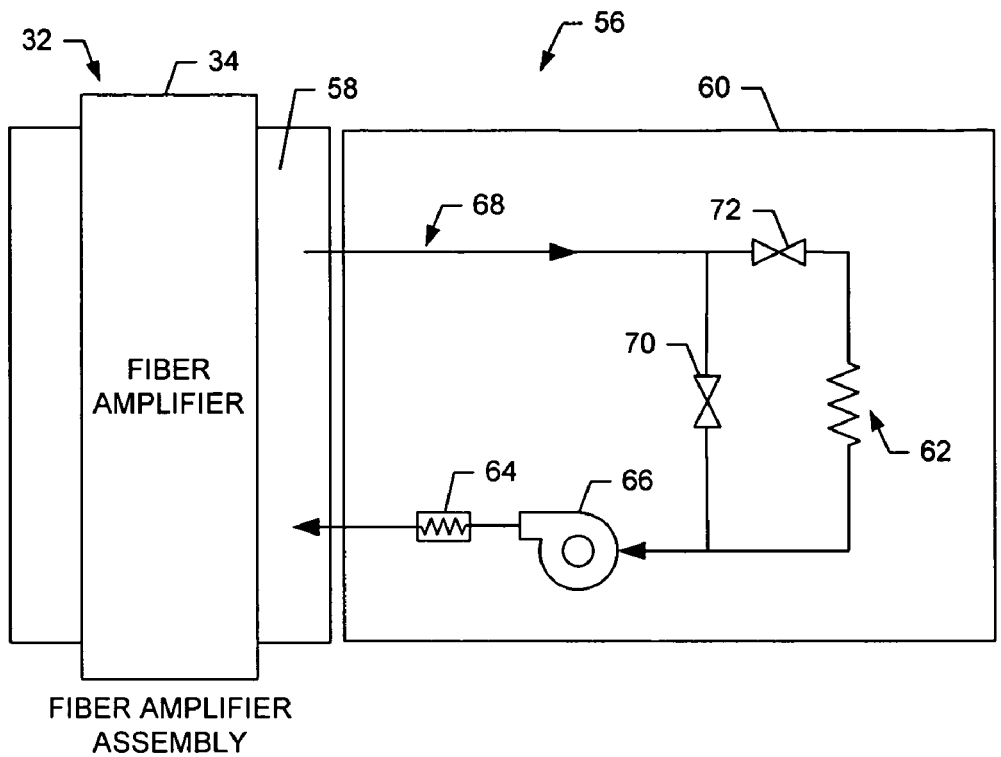
Figure 9:
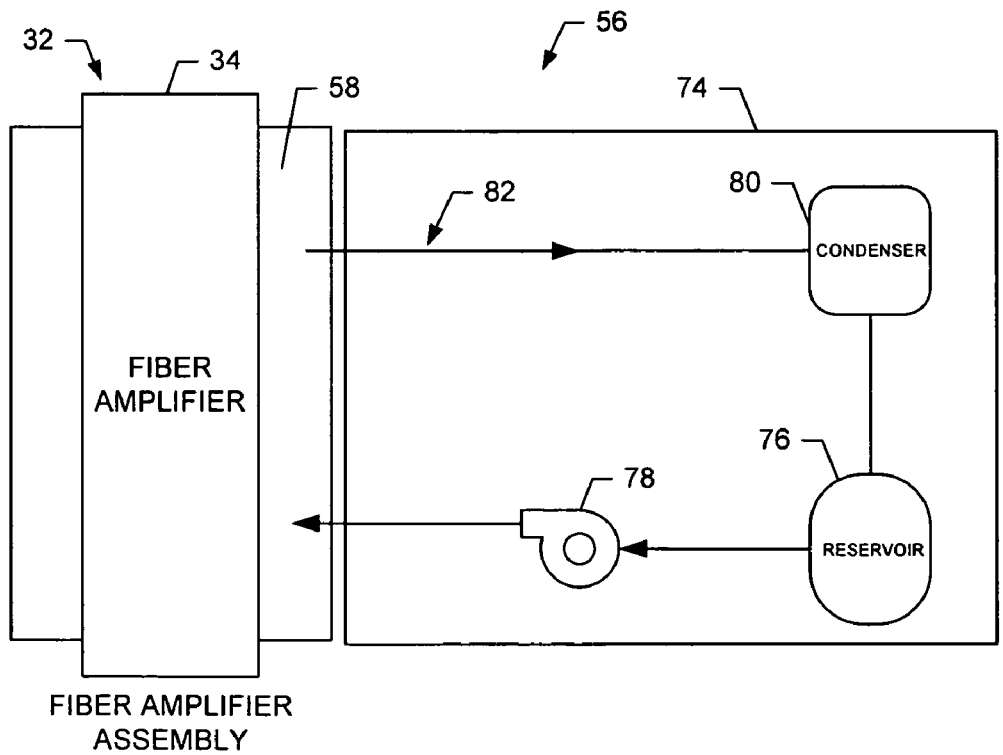

Having thus described the invention in general terms, reference will now be made to the accompanying drawings, which are not necessarily drawn to scale, and wherein:

FIGS. 1A and 1B are an orthographic view and a front view, respectively, of a conventional end-pumped dual-clad fiber;

FIG. 2 is a block diagram of selected components of a laser amplifier fabricated using a plurality of fiber amplifiers according to one embodiment of the present invention;

FIGS. 3A-3D illustrate alternative configurations of selected fiber amplifiers employed in a high power coherent laser amplifier according to one embodiment of the present invention;

FIGS. 4, 5 and 6 are orthographic views of a fiber amplifier according to various embodiments of the present invention;

FIG. 7 is an orthographic view of an arrangement of a plurality of fiber amplifiers within a spacer to thereby facilitate cooling the fiber amplifiers; and FIGS. 8 and 9 are schematic block diagrams of systems for cooling a fiber amplifier according to embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

One example of a coherent phased array of fiber optic amplifiers suitable for use in the present invention for generating high-power laser beams needed for long-range radar system applications is shown in FIG. 2. This particular laser power amplifier is described in detail in U.S. Pat. No. 5,694,408, the contents of which are hereby incorporated by reference herein in its entirety. It will be appreciated that the power splitter, amplifier and phase modulator elements in FIG. 2 may be arranged in various configurations other than the exemplary arrangement illustrated in that Figure.

Figure 3A:
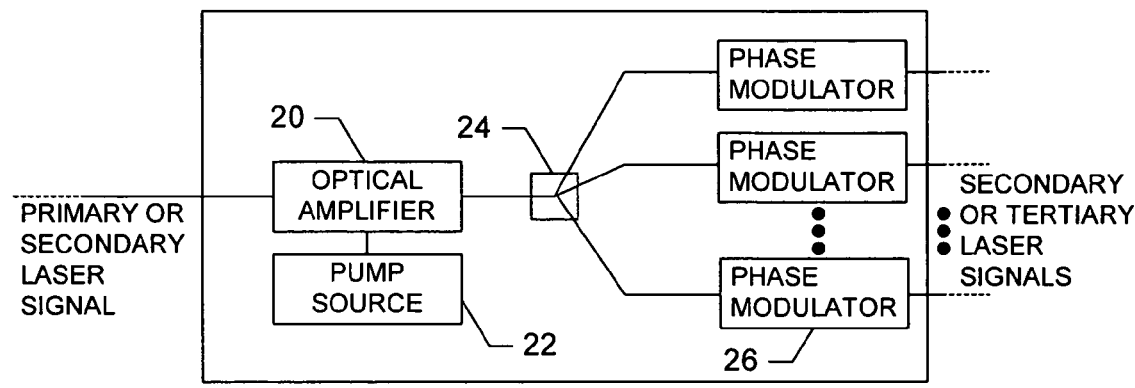
Figure 3B:
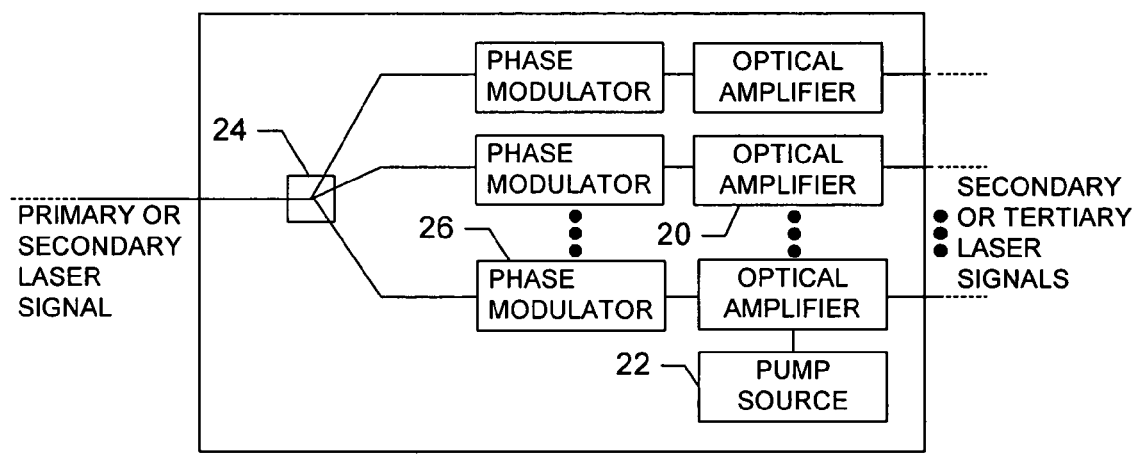

The fiber optic power amplifier 10 illustrated in FIG. 2 includes an input laser beam coupled to a fiber optic power amplifier 12. The laser beam can comprise, for example, a stable, very narrow linewidth, laser beam capable of operating in a $TEM_{00}$ mode at a frequency within the gain spectrum of the power amplifier, and capable of being coupled via an optical fiber to deliver a continuous wave or pulsed signal to downstream components. The fiber optic power amplifier also includes a first stage composed of a first beam splitter element 14, for splitting a received laser beam into a number N of secondary laser beams. Each of the secondary laser beams is provided to a second beam splitter element 16, which produces a number M of tertiary laser beams from a respective one of the secondary laser beams. Each of the tertiary laser beams is amplified by a respective fiber amplifier generally denoted 18. It will be appreciated that although two separate stages of beam splitter elements and one amplifier stage are depicted in FIG. 2, the fiber optic power amplifier can have more or less amplification stages. For example, when the first and second beam splitter elements include one or more optical amplifiers 20 pumped by one or more pump sources 22, a beam splitter 24 and, optionally, a number N×M phase modulators 26, respectively, a total of three amplification stages are included in the power amplifier, as shown in FIGS. 3A and 3B.

Figure 3C:
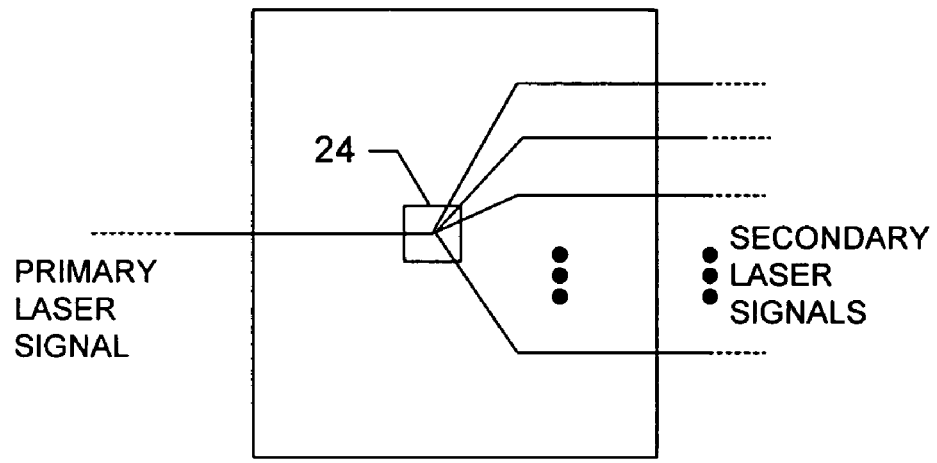
Figure 3D:
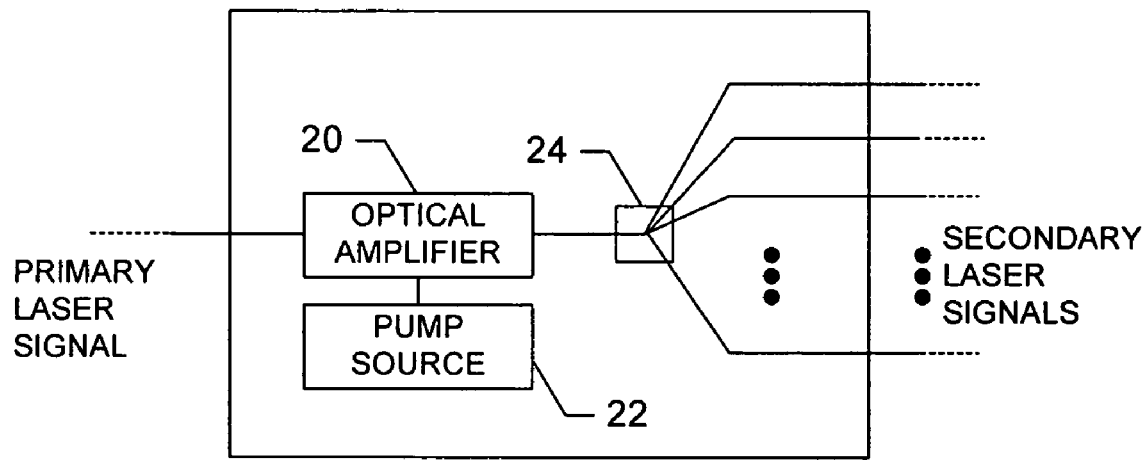

Alternative configurations are also possible. For example, the number of series connected elements, i.e., beamsplitter elements 14, 16, can be any number greater than or equal to two. Moreover, it should be mentioned that the beam splitter construction is not limited to the arrangements illustrated in FIGS. 3A and 3B. For example, as shown in FIG. 3C, the first stage beamsplitter element need not include either an amplifier 20 or a phase modulator 26. Alternatively, the first stage beamsplitter element may include an optical amplifier but omit a phase modulator, as shown in FIG. 3D. It will be appreciated, then, that additional amplifier stages can be provided.

It will be noted that the fiber optic power amplifier 10 includes a phase modulator 26 in each optical path terminating at an output device or in the process of free space propagation of the optical power to a more distant point in space. It will be appreciated that the phase modulators are provided to ensure that all of the N×M laser beams output by power amplifier arrive at the output device, e.g., a lens, with a predetermined phase profile to minimize the losses produced in output device. This may be to either produce a uniform phase across the N×M array of fibers, or as a phase conjugate arrangement of wavefronts across the N×M array so as to correct for the optical distortions elsewhere in the optical system. Such a method of phase conjugate correction may also be used to compensate for external aberrations to an optical system such as atmospheric turbulence or optical errors in any other transmissive, reflective or refractive optical media (e.g., fibers, lenses, mirrors, gratings, windows, etc.). The power amplifier of FIG. 2 includes a waveform sensor 28 in the output optical path, where the sensor signals are provided to phase modulators 26 in elements 20, 30 via an adaptive waveform controller 30. Examples of the construction and operation of waveform sensor and waveform controller are provided in above-referenced U.S. Pat. No. 5,694,408.

As explained in the background section, in continuous or quasi-steady operational modes, the temperature of a fiber amplifier can rise until an equilibrium heat transfer condition is established. For high power laser systems, such a rise in temperature can result in elevated temperatures in the core of the fiber amplifier, which can degrade the efficiency of the laser system, lead to unacceptable optical distortions or, in the extreme, to failure of the fiber amplifiers or surrounding system materials and components. Thus, in accordance with embodiments of the present invention, a fiber amplifier assembly is provided that is capable of axial cooling a fiber amplifier, such as a dual-clad fiber amplifier, by transferring heat away from the core of the fiber amplifier.

Referring to FIGS. 4, 5 and 6, the fiber amplifier assembly 32 of embodiments of the present invention generally includes a fiber amplifier 34. In turn, the fiber amplifier includes a single-mode signal core 36, which is typically doped with one or more rare earth elements (e.g., ytterbium, neodymium, praseodymium, erbium, holmium, thulium, or other rare-earth elements that have energetic ions, etc.), and a multi-mode pump core 38 surrounding the signal core. As an example, the fiber amplifier can comprise a dual-clad fiber amplifier including a signal core formed of boro-germanosilicate glass and doped with ytterbium and erbium, and a multi-mode pump core formed of silica glass. The dual-clad fiber also typically includes an outer cladding layer 40, such as an outer cladding layer formed of fluorinated polymers or polycarbonate resins. In this regard, the outer cladding layer surrounds the pump core for confining pump energy within the pump core such that signals propagating through the signal core are amplified.

Unlike conventional fiber amplifiers, however, the fiber amplifier assembly 32 of embodiments of the present invention includes a jacket 42. The jacket surrounds the outer cladding layer 40 and is spaced apart from the outer cladding layer, thus defining a passage 44 between the jacket and the cladding layer. The jacket can be formed of any of a number of different materials, including plastics, glasses or metals. The jacket can be formed of any materials of sufficient structural strength as to confine coolant and a retaining structure (described below), yet have sufficient flexibility to bend as needed for handling and installation of the fiber amplifier assembly, as desired. If so desired, the materials forming the jacket can be transparent or opaque, and/or selected in accordance with constraints such as protection from optical radiation, a safety constraint. The jacket can further be formed of materials selected to protect the fiber amplifier from the external environment, handling of the fiber amplifier 34, abrasion by external means, and crushing forces.

To at least partially maintain the position of the fiber amplifier 34 with respect to the jacket 42, such as centered within the jacket, the fiber amplifier assembly 32 can further include a retaining structure disposed within the passage between the jacket and the cladding layer, the jacket and retaining structure collectively being referred to as a cooling structure. The retaining structure can comprise any of a number of different structures that maintain the position of the fiber amplifier within the jacket while preserving at least a portion of the passage. For example, as shown in FIG. 4, the retaining structure can comprise a spiral spacer 46, such as a nylon, fused silica or Teflon® spiral spacer, wrapped around the fiber amplifier along the length of the fiber. In addition to retaining the fiber amplifier within the jacket, the spiral spacer can comprise another fiber amplifier. As such, when the spiral spacer and the fiber amplifier do not include outer cladding layers 40, the spiral spacer can also carry pump energy into the center fiber amplifier.

In another example, shown in FIG. 5, the retaining structure comprises a fluted structure positioned about the fiber amplifier 34. More particularly, the retaining structure comprises a plurality of ribs 48, such as a plurality of ribs formed of plastic, glass, or metal spaced angularly from one another and extending both outwardly from and longitudinally along the fiber amplifier. In this regard, the spacing between the ribs bifurcates the passage between the fiber amplifier and the jacket. Further, in yet another embodiment, shown in FIG. 6, the retaining structure comprises a plurality of static or slow moving phase change thermal pellets 50. Such pellets, then, can at least partially melt, or more particularly melt or vaporize, at a desired control temperature, as described below.

Irrespective of the configuration of the retaining structure, the fiber amplifier assembly 32 can be constructed such that the velocity of coolant circulated between the fiber amplifier 34 and the jacket 42 is selected to achieve a low-pressure drop and a desirable rise in the coolant temperature. Also, properties of the fiber amplifier assembly, such as the size and/or geometry of the passage 44 defined between the jacket and the cladding layer 40, the coolant viscosity, volumetric changes of the coolant, and/or pressure within the passage can be selected to minimize the size of the passage and energy required to circulate coolant through the passage. In this regard, the length of the passage along the fiber amplifier can also be balanced by the cross-sectional area of the passage to provide a desirable pressure drop for the coolant circulating through the passage.

In another embodiment, shown in FIG. 7, the fiber amplifier assembly 32 of another embodiment of the present invention includes at least one fiber amplifier mounted in a serpentine manner through at least one sheet spacer 52 (one shown in FIG. 7) that maintains separation between portions of the fiber amplifiers. The sheet spacer can be fabricated from any of a number of different materials, including plastics or metals such as nylon, Teflon®, Kynar®, Lexan®, or other polyamide, polycarbonate, or polyaramid materials. Such an arrangement can be referred to as a "tube bundle" heat exchanger arrangement. Also, in such an arrangement, the spacing between the separated fiber amplifier portions can be considered to define a passage (designated by arrows 54) in a similar manner as defined above.

As will be appreciated, the sheet spacer 52 can be embodied in a solid sheet, or as an alternative, embodied in woven fibers, and can be fabricated from any of a number of different materials, including plastics and metals. For example, the sheet spacer can be fabricated from a weave of fiber materials such as polyamides, graphitic carbon, aramids, nylon, Teflon®, or metal meshes. In this regard, the sheet spacer can be fabricated from material selected to provide structural stiffness and spacing of the portions of the fiber amplifiers 34 such that coolant can freely circulate through the passage 54 defined between the fiber amplifier portions (described below). Additionally or alternatively, the sheet spacer can be fabricated from material non-abrasive to the fiber amplifiers, and/or having sufficient flexibility to bend as needed for handling and installation of the fiber amplifier assembly, as desired.

When the fiber amplifier assembly 32 includes more than one sheet spacer, the sheet spacers can be separated from one another at a distance sufficient to support and constrain the portions of the fiber amplifier 34 such that the portions experience reduced bending or vibration due to the action of coolant circulating through the passage 54 defined between the fiber amplifier portions (described below). As shown, the fiber amplifiers can be mounted through the sheet spacer in a manner such that the fiber amplifiers extend through the sheet spacers and bend back through the sheet spacers, with the fiber amplifiers having a bend radius selected for margin against stress-induced breakage of the fiber amplifier, and/or to reduce optical losses in the fiber amplifier.

Because the passage is defined between the fiber amplifier and the jacket (or between the fiber amplifier portions as in FIG. 7), the passage presents an avenue by which heat can be carried away from the fiber amplifier. In this regard, a coolant can be passed through the passage such that heat from the fiber amplifier is transferred to the coolant and carried away by the coolant as the coolant flows through the passage. Alternatively, the coolant can be positioned within the passage in a stagnant manner.

Reference is now made to FIG. 8, which illustrates a system for cooling a fiber amplifier according to one embodiment of the present invention. As shown, the system 56 of one embodiment of the present invention includes a fiber amplifier assembly 32 that includes a fiber amplifier 34 and defines a passage 58 (e.g., between the fiber amplifier and jacket 42 as shown in FIGS. 4, 5 and 6; between separated fiber amplifier portions as shown in FIG. 7). In addition to the fiber amplifier assembly, the system includes a thermal management system 60 capable of circulating coolant through the passage defined between the fiber amplifier and the jacket.

The coolant can comprise, for example, water, chlorofluorocarbon refrigerants, ethylene glycol, commercial silicone fluids (e.g., Dowtherm™ or Syltherm™ fluids), electronic coolants such as Fluorinert™, poly-alpha olefins, alcohols, perchloroethylene, carbon tetrachloride, various liquid fuels or the like. Also, for example, the coolant can comprise cryogenic fluids such as liquid nitrogen, liquid carbon dioxide, or other condensed gases, particularly for low temperature operations. More generally, however, the coolant can be selected to have low optical absorption, refractive index lower than the cladding layer 40, good heat transfer properties, low viscosity, and non-corrosive interaction with the jacket 42, sheet spacer 52, and fiber amplifier 34. In various instances, the coolant can comprise a suitable gaseous material such as helium, nitrogen, carbon dioxide, air or other non-corrosive gases or mixtures. Such fluids can be selected for operating conditions, for example, approximating ambient temperatures of the external environment surrounding the fiber amplifier assembly 34, temperatures above the ambient temperatures, or cryogenic temperatures.

As shown, the thermal management system 60 is a closed-loop system and, as such, is particularly suitable for very long, continuous operation. It should be understood, however, that the thermal management system can alternatively comprise an open-loop system without departing from the spirit and scope of the present invention. The thermal management system generally comprises a closed-loop including a heat exchanger 62, a heater 64, a pump 66 (e.g., a fluid pump) and plurality of transfer lines forming a closed-flow loop 68. In addition, the system can incorporate valves 70 and 72 that allow coolant to pass the heat exchanger. As will be appreciated by those skilled in the art, the thermal management system may further incorporate valves, reservoirs, accumulators, sensors and other flow loop control and instrumentation devices as may be required to maintain temperature, flow rate, and pressure of the coolant in each loop within prescribed limits. As will also be appreciated, the thermal management system may further include filtration and purification components to reduce the amount of contaminants and corrosive elements in the coolant that could otherwise impede the effectiveness of the thermal management system or cause damage to the fibers or surrounding components. In addition, the flow loop can be arranged in any one of a number of manners to circulate coolant through the passage defined by the fiber amplifier assembly 32 to thereby directly or indirectly cool the fiber amplifier 34.

During normal operation of the flow loop 68, valve 72 is open and valve 70 is closed, while the pump 66 is capable of circulating a coolant from the heat exchanger 62 through the passage 58 defined by the fiber amplifier assembly 32, and back through heat exchanger. In one more particular embodiment, the coolant can comprise an emulsion of phase change materials that at least partially melt, or more typically melt or vaporize, at a desired control temperature, as shown in FIG. 6. As indicated above, the coolant can be selected to have a refractive index smaller than that of the outer cladding layer 40 of the fiber amplifier 34. By selecting the coolant as such, the coolant is capable of being circulated through the passage while maintaining the waveguide properties of the fiber amplifier. In this regard, typically in waveguide design, the refractive index of outer layers or cores is selected to be lower than the refractive index of more inner layers to thereby more readily confine pump energy and signal energy within the more inner layers.

In operation, the fiber amplifier 34 produces heat in the fiber amplifier assembly 32. Heat generated in the fiber amplifier assembly is carried away from the fiber amplifier to the heat exchanger 62 by the coolant circulating in the flow loop 68. The thermal management system 60 typically delivers coolant to the fiber amplifier assembly at a predetermined temperature that can be maintained within a narrow range of typically few degrees Centigrade to provide more exact thermal management of the fiber amplifier assembly, or more particularly, the fiber amplifier. Within the flow loop 68, then, coolant is fed into the heat exchanger 62 at a temperature sufficiently high so that the heat exchanger can reject the heat into a fluid, such as air or water, or released by thermal radiation through an extended array of surfaces to a sufficiently cold background environment (such as may occur in space applications).

Prior to starting operation of the fiber amplifier 34, the coolant in the flow loop 68 of the thermal management system 60 can be warmed up from an in-operational temperature (e.g., ambient temperature) to an operational temperature of the flow loop. As such, a heater 64, which can be electrically operated, can serve to warm the coolant in the loop. Also, during normal operation, the heater can make minor temperature adjustments to the coolant in the flow loop. In this regard, the coolant can be warmed by closing valve 72 and opening valve 70, while the pump 66 re-circulates the coolant through the heater, thereby warming the coolant to a normal operating temperature. As the coolant warms, valve 72 can be gradually opened to allow the heat exchanger 62 to warm up. And when the coolant reaches the operational temperature, valve 70 can be closed shut.

It will be appreciated that the thermal management system 60 of the system 56 illustrated in FIG. 8 can be implemented in a number of variants without departing from the spirit and scope of the present invention. For example, FIG. 9 illustrates a thermal management system 74 particularly suited for instances in which the coolant comprises an emulsion of phase change materials. As shown, the thermal management system of FIG. 9 generally comprising a reservoir 76, a pump (e.g., fluid pump) 78, a condenser 80 and plurality of transfer lines forming a flow loop 82. As before, as will be appreciated by those skilled in the art, the thermal management system may further incorporate valves, reservoirs, accumulators, sensors, and other flow loop control and instrumentation devices as may be required to maintain temperature, flow rate, and pressure of the coolant in each loop within prescribed limits.

During normal operation, the pump 78 draws coolant from the reservoir 76 and feeds the coolant of phase change materials through the fiber amplifier assembly 32. As the coolant passes through the fiber amplifier assembly, the phase change materials at least partially melt, or in one embodiment vaporize, at a desired control temperature, thus carrying away the heat generated by the fiber amplifier 34. The melted or vaporized phase change materials can then be fed into the condenser 80. While inside the condenser, at least a portion of the coolant can be cooled or otherwise condensed back into its original condition. Thereafter, the coolant can pass to the reservoir 76, where the process repeats.

As indicated above, the coolant can comprise an emulsion of phase change materials. It should be appreciated that the phase change materials can comprise chemical compositions that have phase change points at desired temperature conditions, and sufficient latent heat of fusion or boiling to absorb heat from the fiber amplifier 34 during normal operation. The emulsion of phase change materials can comprise, for example, a mixed phase slurry of solid particles suspended in a carrier fluid, a mist of liquid droplets in a carrier gas. Also, for example, the phase change materials can comprise a chemical composition encapsulated in a suitable material, such as microscopic metal or plastic containments, where the encapsulated composition is suspended in a carrier fluid. In such an arrangement, encapsulating the composition can be capable of physically isolating the composition from the carrier fluid without significantly impairing thermal communication between the composition and the fiber amplifier. Further, for example, the phase change materials can be selected to include any of a variety of paraffin waxes, hexane, water, ammonia, alcohols, refrigerants, or any other materials that have the desired range of phase change temperatures and characteristics.

It should be appreciated that coolant comprising phase change materials need not be circulated through the passage 58 (e.g., between the fiber amplifier and jacket 42 as shown in FIGS. 4, 5 and 6; between separated fiber amplifier portions as shown in FIG. 7). Alternatively, the phase change materials can be positioned within the passage, and in thermal communication with the fiber amplifier 34 such that the phase change materials remain at least partially stationary. A secondary coolant, such as a carrier fluid within which the phase change materials (e.g., encapsulated chemical composition) are suspended, can then be circulated between or otherwise placed in thermal communication with the phase change materials to cool and condense the phase change materials during or between periods of normal operation. As will be appreciated, such an arrangement can provide a surge capability for rapid heat removal from the fiber amplifiers for a short period while not requiring as large a pump and heat exchanger combination that could otherwise be required to remove the heat load in a continuous, real-time manner. For high power laser weapons and certain high power industrial applications, for example, such an arrangement could be implemented to reduce the size and weight of the thermal management system 60.

As shown and described above, the fiber amplifier assembly 32 includes a fiber amplifier 34 comprising a dual-clad fiber amplifier. It should be understood, however, that the fiber amplifier assembly can include any type of fiber. Thus, the fiber amplifier assembly of embodiments of the present invention can comprise any fiber and define a passage such that coolant can be disposed therebetween to transfer heat from the fiber, where the passage can be maintained by a retaining structure. It should also be understood that, although the term "fiber amplifier" is used herein, the term "fiber amplifier" implies any and all variations of the same, including "fiber laser," "fiber laser amplifier," "fiber laser oscillator" and the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for cooling a fiber amplifier, the system comprising:
   a fiber amplifier assembly comprising:
   a longitudinally-extending fiber amplifier, the fiber amplifier including a core and a cladding;
   a longitudinally-extending jacket having a single substantially centrally-located passage within which the fiber amplifier, including the core and the cladding, is disposed such that the fiber amplifier assembly defines a passage between the jacket and the fiber amplifier, including the core and the cladding, for the circulation of coolant therethrough; and
   a retaining structure disposed within the passage defined by the fiber amplifier assembly for at least partially maintaining a spacing between the fiber amplifier and jacket, wherein the retaining structure and coolant comprise an emulsion of phase change material.

2. A system according to claim 1 further comprising:
a thermal management system capable of circulating coolant through the passage defined between the jacket and fiber amplifier of the fiber amplifier assembly.

3. system according to claim 2, wherein the thermal management system is capable of placing coolant in thermal communication with the fiber amplifier such that the coolant is capable of carrying heat away from the fiber amplifier, and wherein the thermal management system is capable of rejecting the heat carried away by the coolant.

4. A system according to claim 3, wherein the thermal management system is capable of placing coolant in thermal communication with the fiber amplifier such that the coolant is capable of at least partially melting to thereby carry heat away from the fiber amplifier, and wherein the thermal management system is capable of condensing at least a portion of the at least partially melted coolant to thereby reject the heat carried away by the coolant.

5. A system according to claim 1, wherein the fiber amplifier assembly defines a passage between the jacket and the fiber amplifier for the circulation of coolant selected to have a refractive index smaller than a refractive index of the fiber amplifier.

6. A system according to claim 1, wherein the emulsion of phase change material comprises a plurality of phase change materials suspended in a carrier fluid, wherein each phase change material comprises an encapsulated composition.

7. A method of cooling a fiber amplifier using the system of claim 1, the method comprising:
circulating coolant through the passage defined between the jacket and the fiber amplifier such that the coolant is capable of carrying heat away from the fiber amplifier.

8. A method according to claim 7, wherein circulating coolant comprises:
placing coolant in thermal communication with the fiber amplifier such that the coolant is capable of carrying heat away from the fiber amplifier; and
rejecting the heat carried away by the coolant.

9. A method according to claim 8, wherein placing coolant in thermal communication with the fiber amplifier comprises placing coolant in thermal communication with the fiber amplifier such that the coolant at least partially melts, and
wherein rejecting the heat carried away by the coolant comprises condensing at least a portion of the at least partially melted coolant.

10. A method according to claim 7, wherein circulating coolant comprises circulating coolant selected to have a refractive index smaller than a refractive index of the fiber amplifier.

11. A system for cooling a fiber amplifier, the system comprising:
a fiber amplifier assembly comprising:
a longitudinally-extending fiber amplifier, the fiber amplifier including a core and a cladding:
a jacket surrounding the fiber amplifier, including the core and the cladding, and extending at least partially longitudinally therealong, wherein the jacket surrounds the fiber amplifier such that the fiber amplifier assembly defines a passage between the jacket and the fiber amplifier, including the core and the cladding, for the circulation of coolant therethrough: and
a retaining structure disposed within the passage defined by the fiber amplifier assembly for at least partially maintaining a spacing between the fiber amplifier and jacket, wherein the retaining structure and coolant comprise an emulsion of phase change material,
wherein the emulsion of phase change material comprises a plurality of phase change materials suspended in a carrier fluid, wherein each phase change material comprises an encapsulated composition, and wherein the phase change materials are positioned within the passage such that the phase change materials remain at least partially stationary.

12. A system according to claim 11, wherein the fiber amplifier assembly defines a passage between the jacket and the fiber amplifier such that the phase change materials remain at least partially stationary and the carrier fluid circulates through the passage.

* * * * *